(12) United States Patent
McAlister et al.

(10) Patent No.: US 9,194,337 B2
(45) Date of Patent: Nov. 24, 2015

(54) HIGH PRESSURE DIRECT INJECTED GASEOUS FUEL SYSTEM AND RETROFIT KIT INCORPORATING THE SAME

(71) Applicants: McAlister Technologies, LLC, Phoenix, AZ (US); Advanced Green Technologies, Chandler, AZ (US)

(72) Inventors: Roy Edward McAlister, Phoenix, AZ (US); Kraig Hoekstra, Phoenix, AZ (US); Ryan Kemmet, Chandler, AZ (US); David Grottenthaler, Phoenix, AZ (US); Dustin Wright, Peoria, AZ (US)

(73) Assignee: ADVANCED GREEN INNOVATIONS, LLC, Chandler, AZ (US)

( * ) Notice: Subject to any disclaimer, the term of this patent is extended or adjusted under 35 U.S.C. 154(b) by 0 days.

(21) Appl. No.: 13/829,193

(22) Filed: Mar. 14, 2013

(65) Prior Publication Data

US 2014/0261304 A1 Sep. 18, 2014

(51) Int. Cl.
| | |
|---|---|
| *F02D 41/00* | (2006.01) |
| *F02M 67/00* | (2006.01) |
| *F02M 21/02* | (2006.01) |
| *F02M 69/46* | (2006.01) |

(52) U.S. Cl.
CPC .............. *F02M 21/02* (2013.01); *F02M 69/465* (2013.01); *Y02T 10/32* (2013.01)

(58) Field of Classification Search
CPC .............. F02D 19/061; F02D 19/0684; F02D 2200/0602; F02D 2041/389; F02D 41/3836; F02M 63/0265; F02M 67/00

USPC ......... 123/299, 445, 447–452, 456, 459, 490, 123/521, 525, 557
See application file for complete search history.

(56) References Cited

U.S. PATENT DOCUMENTS

| | | | |
|---|---|---|---|
| 1,307,088 | A | 6/1919 | Drummond |
| 1,451,384 | A | 4/1923 | Whyte |

(Continued)

FOREIGN PATENT DOCUMENTS

| | | |
|---|---|---|
| CN | 1411535 A | 4/2003 |
| DE | 3443022 A1 | 5/1986 |

(Continued)

OTHER PUBLICATIONS

U.S. Appl. No. 13/797,351, filed Mar. 12, 2013, McAlister (Continued)

*Primary Examiner* — John Kwon
*Assistant Examiner* — Johnny H Hoang
(74) *Attorney, Agent, or Firm* — Loeb & Loeb LLP

(57) ABSTRACT

A high-pressure direct injected gaseous fuel system comprising a fuel tank capable of storing fuel at a first pressure and a compressor including an inlet capable of receiving the fuel, and operative to supply, at an outlet, compressed fuel at a second pressure higher than the first. The system also includes an accumulator connected to the outlet and a plurality of injectors connected to the accumulator. The injectors are adapted to inject fuel directly into a combustion chamber. The system includes a pressure relief valve interconnecting the fuel tank and the outlet, wherein the pressure relief valve is operative to allow fuel flow between the fuel tank and outlet if the second pressure exceeds a threshold pressure.

19 Claims, 1 Drawing Sheet

(56) References Cited

U.S. PATENT DOCUMENTS

| | | |
|---|---|---|
| 2,255,203 A | 9/1941 | Wiegand |
| 2,864,974 A | 12/1958 | Beye |
| 3,058,453 A | 10/1962 | May |
| 3,060,912 A | 10/1962 | May |
| 3,081,758 A | 3/1963 | May |
| 3,149,620 A | 9/1964 | Cataldo |
| 3,243,335 A | 3/1966 | Faile |
| 3,286,164 A | 11/1966 | De Huff |
| 3,361,161 A | 1/1968 | Schwartz |
| 3,373,724 A | 3/1968 | Papst |
| 3,520,961 A | 7/1970 | Suda et al. |
| 3,551,738 A | 12/1970 | Young |
| 3,594,877 A | 7/1971 | Suda et al. |
| 3,608,050 A | 9/1971 | Carman et al. |
| 3,689,293 A | 9/1972 | Beall |
| 3,762,170 A | 10/1973 | Fitzhugh |
| 3,802,194 A | 4/1974 | Tanasawa et al. |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,992,877 A | 11/1976 | Granger |
| 3,997,352 A | 12/1976 | Beall |
| 4,066,046 A | 1/1978 | McAlister |
| 4,095,580 A | 6/1978 | Murray et al. |
| 4,099,494 A | 7/1978 | Goloff et al. |
| 4,105,004 A | 8/1978 | Asai et al. |
| 4,122,816 A | 10/1978 | Fitzgerald et al. |
| 4,135,481 A | 1/1979 | Resler, Jr. |
| 4,183,467 A | 1/1980 | Sheraton et al. |
| 4,203,393 A | 5/1980 | Giardini |
| 4,313,412 A | 2/1982 | Hosaka et al. |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,402,036 A | 8/1983 | Hensley et al. |
| 4,469,160 A | 9/1984 | Giamei |
| 4,483,485 A | 11/1984 | Kamiya et al. |
| 4,511,612 A | 4/1985 | Huther et al. |
| 4,514,712 A | 4/1985 | McDougal |
| 4,528,270 A | 7/1985 | Matsunaga |
| 4,531,679 A | 7/1985 | Pagdin |
| 4,535,728 A | 8/1985 | Batchelor |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,688,538 A | 8/1987 | Ward et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,830,286 A | 5/1989 | Asslaender et al. |
| 4,841,925 A | 6/1989 | Ward |
| 4,922,883 A | 5/1990 | Iwasaki |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,076,223 A | 12/1991 | Harden et al. |
| 5,095,742 A | 3/1992 | James et al. |
| 5,109,817 A | 5/1992 | Cherry |
| 5,131,376 A | 7/1992 | Ward et al. |
| 5,134,982 A | 8/1992 | Hosoi |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,343,699 A | 9/1994 | McAlister |
| 5,361,737 A | 11/1994 | Smith et al. |
| 5,377,633 A | 1/1995 | Wakeman |
| 5,392,745 A | 2/1995 | Beck |
| 5,394,852 A | 3/1995 | McAlister |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,473,502 A | 12/1995 | Bonavia et al. |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,534,781 A | 7/1996 | Lee et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,598,699 A | 2/1997 | Few et al. |
| 5,605,125 A | 2/1997 | Yaoita |
| 5,607,106 A | 3/1997 | Bentz et al. |
| 5,649,507 A | 7/1997 | Gregoire et al. |
| 5,676,026 A | 10/1997 | Tsuboi et al. |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,769,049 A | 6/1998 | Nytomt et al. |
| 5,797,427 A | 8/1998 | Buescher |
| 5,806,581 A | 9/1998 | Haasch et al. |
| 5,816,224 A | 10/1998 | Welsh et al. |
| 5,832,906 A * | 11/1998 | Douville et al. ............... 123/527 |
| 5,853,175 A | 12/1998 | Udagawa |
| 5,863,326 A | 1/1999 | Nause et al. |
| 5,876,659 A | 3/1999 | Yasutomi et al. |
| 5,896,842 A | 4/1999 | Abusamra |
| 5,915,272 A | 6/1999 | Foley et al. |
| 5,930,420 A | 7/1999 | Atkins et al. |
| 5,941,207 A | 8/1999 | Anderson et al. |
| 6,015,065 A | 1/2000 | McAlister |
| 6,017,390 A | 1/2000 | Charych et al. |
| 6,026,568 A | 2/2000 | Atmur et al. |
| 6,029,627 A | 2/2000 | VanDyne |
| 6,029,640 A | 2/2000 | Bengtsson et al. |
| 6,062,498 A | 5/2000 | Klopfer |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,138,639 A | 10/2000 | Hiraya et al. |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,335,065 B1 | 1/2002 | Steinlage et al. |
| 6,340,015 B1 | 1/2002 | Benedikt et al. |
| 6,360,721 B1 | 3/2002 | Schuricht et al. |
| 6,360,730 B1 * | 3/2002 | Koethe ............... 123/541 |
| 6,378,485 B2 | 4/2002 | Elliott |
| 6,386,178 B1 | 5/2002 | Rauch |

(56) References Cited

U.S. PATENT DOCUMENTS

| | | | |
|---|---|---|---|
| 6,443,373 | B1 | 9/2002 | Portugues |
| 6,446,597 | B1 | 9/2002 | McAlister |
| 6,453,660 | B1 | 9/2002 | Johnson et al. |
| 6,455,173 | B1 | 9/2002 | Marijnissen et al. |
| 6,478,007 | B2 | 11/2002 | Miyashita et al. |
| 6,483,311 | B1 | 11/2002 | Ketterer et al. |
| 6,490,391 | B1 | 12/2002 | Zhao et al. |
| 6,501,875 | B2 | 12/2002 | Zhao et al. |
| 6,503,584 | B1 | 1/2003 | McAlister |
| 6,506,336 | B1 | 1/2003 | Beall et al. |
| 6,516,114 | B2 | 2/2003 | Zhao et al. |
| 6,517,011 | B1 | 2/2003 | Ayanji et al. |
| 6,532,315 | B1 | 3/2003 | Hung et al. |
| 6,542,663 | B1 | 4/2003 | Zhao et al. |
| 6,543,700 | B2 | 4/2003 | Jameson et al. |
| 6,549,713 | B1 | 4/2003 | Pi et al. |
| 6,556,746 | B1 | 4/2003 | Zhao et al. |
| 6,567,599 | B2 | 5/2003 | Hung |
| 6,571,035 | B1 | 5/2003 | Pi et al. |
| 6,578,775 | B2 | 6/2003 | Hokao |
| 6,583,901 | B1 | 6/2003 | Hung |
| 6,584,244 | B2 | 6/2003 | Hung |
| 6,587,239 | B1 | 7/2003 | Hung |
| 6,599,028 | B1 | 7/2003 | Shu et al. |
| 6,604,362 | B2 * | 8/2003 | Moeckel ............ 60/614 |
| 6,615,899 | B1 | 9/2003 | Woodward et al. |
| 6,626,164 | B2 | 9/2003 | Hitomi et al. |
| 6,663,027 | B2 | 12/2003 | Jameson et al. |
| 6,668,630 | B1 | 12/2003 | Kuglin et al. |
| 6,672,277 | B2 | 1/2004 | Yasuoka et al. |
| 6,700,306 | B2 | 3/2004 | Nakamura et al. |
| 6,705,274 | B2 | 3/2004 | Kubo |
| 6,722,340 | B1 | 4/2004 | Sukegawa et al. |
| 6,725,826 | B2 | 4/2004 | Esteghlal |
| 6,745,744 | B2 | 6/2004 | Suckewer et al. |
| 6,756,140 | B1 | 6/2004 | McAlister |
| 6,763,811 | B1 | 7/2004 | Tamol, Sr. |
| 6,772,965 | B2 | 8/2004 | Yildirim et al. |
| 6,776,352 | B2 | 8/2004 | Jameson |
| 6,786,200 | B2 | 9/2004 | Viele et al. |
| 6,832,472 | B2 | 12/2004 | Huang et al. |
| 6,832,588 | B2 | 12/2004 | Herden et al. |
| 6,841,309 | B1 | 1/2005 | Alpay et al. |
| 6,845,920 | B2 | 1/2005 | Sato et al. |
| 6,850,069 | B2 | 2/2005 | McQueeney et al. |
| 6,851,413 | B1 | 2/2005 | Tamol, Sr. |
| 6,854,438 | B2 | 2/2005 | Hilger et al. |
| 6,871,630 | B2 | 3/2005 | Herden et al. |
| 6,881,386 | B2 | 4/2005 | Rabinovich et al. |
| 6,883,490 | B2 | 4/2005 | Jayne |
| 6,883,507 | B2 | 4/2005 | Freen |
| 6,899,076 | B2 | 5/2005 | Funaki et al. |
| 6,904,893 | B2 | 6/2005 | Hotta et al. |
| 6,912,998 | B1 | 7/2005 | Rauznitz et al. |
| 6,925,983 | B2 | 8/2005 | Herden et al. |
| 6,940,213 | B1 | 9/2005 | Heinz et al. |
| 6,954,074 | B2 | 10/2005 | Zhu et al. |
| 6,976,683 | B2 | 12/2005 | Eckert et al. |
| 6,978,767 | B2 | 12/2005 | Bonutti |
| 6,984,305 | B2 | 1/2006 | McAlister |
| 6,993,960 | B2 | 2/2006 | Benson |
| 6,994,073 | B2 | 2/2006 | Tozzi et al. |
| 7,007,658 | B1 | 3/2006 | Cherry et al. |
| 7,013,863 | B2 | 3/2006 | Shiraishi et al. |
| 7,025,358 | B2 | 4/2006 | Ueta et al. |
| 7,032,845 | B2 | 4/2006 | Dantes et al. |
| 7,070,126 | B2 | 7/2006 | Shinogle |
| 7,073,480 | B2 | 7/2006 | Shiraishi et al. |
| 7,086,376 | B2 | 8/2006 | McKay |
| 7,104,246 | B1 | 9/2006 | Gagliano et al. |
| 7,104,250 | B1 | 9/2006 | Yi et al. |
| 7,121,253 | B2 | 10/2006 | Shiraishi et al. |
| 7,124,964 | B2 | 10/2006 | Bui |
| 7,131,426 | B2 | 11/2006 | Ichinose et al. |
| 7,137,382 | B2 | 11/2006 | Zhu et al. |
| 7,138,046 | B2 | 11/2006 | Roychowdhury |
| 7,140,347 | B2 | 11/2006 | Suzuki et al. |
| 7,198,208 | B2 | 4/2007 | Dye et al. |
| 7,204,133 | B2 | 4/2007 | Benson et al. |
| 7,249,578 | B2 | 7/2007 | Fricke et al. |
| 7,255,290 | B2 | 8/2007 | Bright et al. |
| 7,272,487 | B2 | 9/2007 | Christen et al. |
| 7,278,392 | B2 | 10/2007 | Zillmer et al. |
| 7,302,792 | B2 | 12/2007 | Land, III et al. |
| 7,340,118 | B2 | 3/2008 | Wlodarczyk et al. |
| 7,367,319 | B2 | 5/2008 | Kuo et al. |
| 7,386,982 | B2 | 6/2008 | Runkle et al. |
| 7,395,146 | B2 | 7/2008 | Ueda et al. |
| 7,404,395 | B2 | 7/2008 | Yoshimoto |
| 7,418,940 | B1 | 9/2008 | Yi et al. |
| 7,435,082 | B2 * | 10/2008 | Jayne ............ 431/264 |
| 7,449,034 | B1 | 11/2008 | Mikkelsen et al. |
| 7,481,043 | B2 | 1/2009 | Hirata et al. |
| 7,484,369 | B2 | 2/2009 | Myhre |
| 7,554,250 | B2 | 6/2009 | Kadotani et al. |
| 7,625,531 | B1 | 12/2009 | Coates et al. |
| 7,626,315 | B2 | 12/2009 | Nagase |
| 7,628,137 | B1 | 12/2009 | McAlister |
| 7,628,145 | B2 | 12/2009 | Ishibashi et al. |
| 7,650,873 | B2 | 1/2010 | Hofbauer et al. |
| 7,690,352 | B2 | 4/2010 | Zhu et al. |
| 7,703,775 | B2 | 4/2010 | Matsushita et al. |
| 7,707,832 | B2 | 5/2010 | Commaret et al. |
| 7,714,483 | B2 | 5/2010 | Hess et al. |
| 7,721,697 | B2 | 5/2010 | Smith et al. |
| 7,728,489 | B2 | 6/2010 | Heinz et al. |
| 7,849,833 | B2 | 12/2010 | Toyoda |
| 7,900,850 | B2 | 3/2011 | Zengerle et al. |
| 7,918,212 | B2 | 4/2011 | Verdejo et al. |
| 8,037,849 | B1 * | 10/2011 | Staroselsky et al. ........ 123/1 A |
| 8,069,836 | B2 | 12/2011 | Ehresman |
| 8,104,444 | B2 | 1/2012 | Schultz |
| 8,147,599 | B2 | 4/2012 | McAlister |
| 8,192,852 | B2 | 6/2012 | McAlister |
| 8,240,293 | B2 | 8/2012 | Ikeda |
| 8,267,063 | B2 | 9/2012 | McAlister |
| 8,312,759 | B2 | 11/2012 | McAlister |
| 8,318,131 | B2 | 11/2012 | McAlister |
| 8,416,552 | B2 | 4/2013 | Gefter et al. |
| 8,441,361 | B2 | 5/2013 | McAlister |
| 8,511,259 | B2 | 8/2013 | Ambrosini et al. |
| 8,578,902 | B2 | 11/2013 | Permuy et al. |
| 8,601,819 | B2 | 12/2013 | Hammer et al. |
| 8,646,432 | B1 | 2/2014 | McAlister et al. |
| 2002/0017573 | A1 | 2/2002 | Sturman |
| 2002/0070287 | A1 | 6/2002 | Jameson et al. |
| 2002/0084793 | A1 | 7/2002 | Hung et al. |
| 2002/0088230 | A1 * | 7/2002 | Coleman et al. ............ 60/605.1 |
| 2002/0131171 | A1 | 9/2002 | Hung |
| 2002/0131666 | A1 | 9/2002 | Hung et al. |
| 2002/0131673 | A1 | 9/2002 | Hung |
| 2002/0131674 | A1 | 9/2002 | Hung |
| 2002/0131706 | A1 | 9/2002 | Hung |
| 2002/0131756 | A1 | 9/2002 | Hung |
| 2002/0141692 | A1 | 10/2002 | Hung |
| 2002/0150375 | A1 | 10/2002 | Hung et al. |
| 2002/0151113 | A1 | 10/2002 | Hung et al. |
| 2003/0012985 | A1 | 1/2003 | McAlister |
| 2004/0008989 | A1 | 1/2004 | Hung |
| 2004/0084017 | A1 | 5/2004 | Viele et al. |
| 2004/0084026 | A1 | 5/2004 | Zhu et al. |
| 2004/0187847 | A1 | 9/2004 | Viele et al. |
| 2005/0126537 | A1 | 6/2005 | Daniels et al. |
| 2005/0255011 | A1 | 11/2005 | Greathouse et al. |
| 2005/0257776 | A1 | 11/2005 | Bonutti |
| 2006/0016916 | A1 | 1/2006 | Petrone et al. |
| 2006/0169244 | A1 | 8/2006 | Allen |
| 2006/0213488 | A1 * | 9/2006 | Post et al. ............ 123/527 |
| 2007/0125338 | A1 * | 6/2007 | Kato et al. ............ 123/304 |
| 2007/0186903 | A1 | 8/2007 | Zhu et al. |
| 2007/0189114 | A1 | 8/2007 | Reiner et al. |
| 2008/0017170 | A1 * | 1/2008 | Moroi et al. ............ 123/456 |
| 2009/0070008 | A1 * | 3/2009 | Batenburg et al. ............ 701/103 |
| 2009/0093951 | A1 | 4/2009 | McKay et al. |

(56) References Cited

U.S. PATENT DOCUMENTS

| | | | |
|---|---|---|---|
| 2009/0101114 A1 | 4/2009 | Czekala et al. | |
| 2009/0120385 A1* | 5/2009 | Munshi et al. | 123/3 |
| 2010/0095747 A1* | 4/2010 | Grunwald | 73/49.2 |
| 2011/0030659 A1* | 2/2011 | Ulrey et al. | 123/521 |
| 2011/0118958 A1* | 5/2011 | Jung et al. | 701/103 |
| 2012/0112620 A1 | 5/2012 | Lykowski et al. | |
| 2012/0137651 A1 | 6/2012 | Taguchi et al. | |
| 2012/0160221 A1* | 6/2012 | Munshi et al. | 123/575 |
| 2012/0174897 A1* | 7/2012 | Ulrey et al. | 123/521 |
| 2012/0180743 A1 | 7/2012 | Burrows et al. | |
| 2012/0199088 A1 | 8/2012 | Burrows et al. | |
| 2012/0210968 A1 | 8/2012 | Burrows et al. | |
| 2013/0149621 A1 | 6/2013 | McAlister | |

FOREIGN PATENT DOCUMENTS

| | | |
|---|---|---|
| DE | 19731329 C1 | 6/1998 |
| DE | 10356133 A1 | 7/2005 |
| DE | 102006021192 A1 | 11/2007 |
| EP | 671555 A1 | 9/1995 |
| GB | 1038490 A | 8/1966 |
| JP | 02-259268 A | 10/1990 |
| JP | 08-049623 A | 2/1996 |
| JP | 2004-324613 A | 11/2004 |
| JP | 2009-287549 A | 12/2009 |

OTHER PUBLICATIONS

U.S. Appl. No. 13/843,976, filed Mar. 15, 2013, McAlister.
U.S. Appl. No. 13/844,240, filed Mar. 15, 2013, McAlister.
U.S. Appl. No. 13/844,488, filed Mar. 15, 2013, McAlister.
"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.
"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.
"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.
"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.
"SmartPlugs—Aviation." SmartPlugs.com. Published: Sep. 2000. Accessed: May 31, 2011. <http://www.smartplugs.com/news/aeronews0900.htm>. pp. 1-3.
Birchenough, Arthur G. "A Sustained-arc Ignition System for Internal Combustion Engines." Nasa Technical Memorandum (NASA TM-73833). Lewis Research Center. Nov. 1977. pp. 1-15.
Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.
Brooks, Michael. "Space Storm Alert: 90 Seconds from Catastrophe." NewScientist. Mar. 23, 2009. pp. 1-7.
Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.
Erjavec, Jack. "Automotive Technology: a Systems Approach, vol. 2." Thomson Delmar Learning. Clifton Park, NY. 2005. p. 845.
Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.
Hollembeak, Barry. "Automotive Fuels & Emissions." Thomson Delmar Learning. Clifton Park, NY. 2005. p. 298.
InfraTec GmbH. "Evaluation Kit for FPI Detectors | Datasheet—Detector Accessory." 2009. pp. 1-2.
Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.
Pall Corporation, Pall Industrial Hydraulics. Increase Power Output and Reduce Fugitive Emissions by Upgrading Hydrogen Seal Oil System Filtration. 2000. pp. 1-4.
Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan 2010. pp. 1-9.
Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.
Salib et al. "Role of Parallel Reformable Bonds in the Self-Healing of Cross-Linked Nanogel Particles." Langmuir, vol. 27, Issue 7. 2011. pp. 3991-4003.
International Search Report and Written Opinion for Application No. PCT/US2009/067044; Applicant: McAlister Technologies, LLC.; Date of Mailing: Apr. 14, 2010 (11 pages).
International Search Report and Written Opinion for Application No. PCT/US2010/002080; Applicant: McAlister Technologies, LLC; Date of Mailing: Jul. 7, 2011 (8 pages).
International Search Report and Written Opinion for Application No. PCT/US2011/024778 Applicant: McAllister Technologies, LLC.; Date of Mailing: Sep. 27, 2011 (10 pages).
International Search Report and Written Opinion for Application No. PCT/US2010/054364; Applicant: McAlister Technologies, LLC.; Date of Mailing: Aug. 22, 2011, 8 pages.
Supplementary European Search Report for Application No. EP 10846264.9; Applicant McAlister Technologies, LLC; Date of Mailin Oct. 2, 2013, 5 pages.
PCT International Search Report issued in connection with Application No. PCT/US2014/025899 received on Feb. 10, 2014, (3 pages).

* cited by examiner

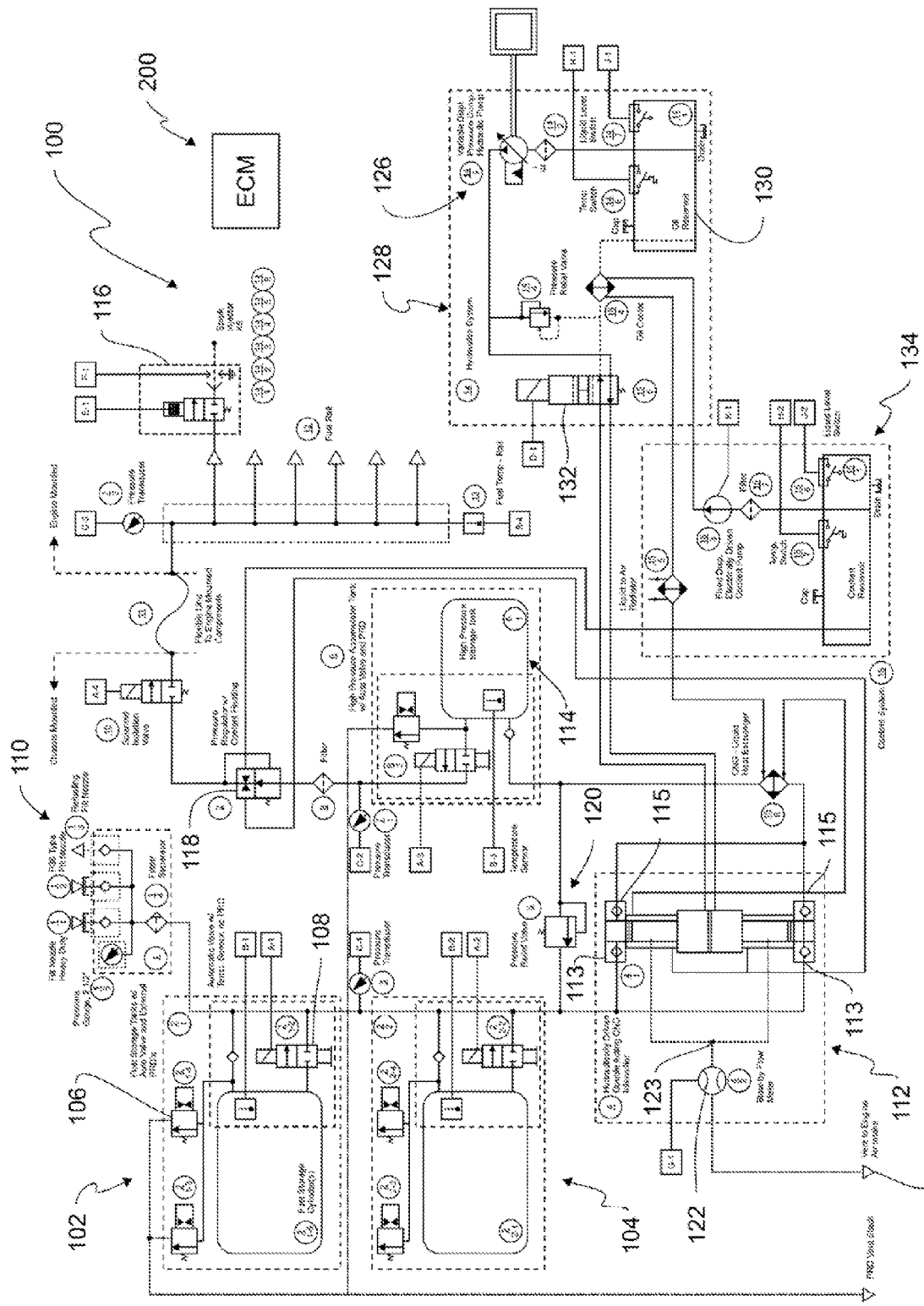

HIGH PRESSURE DIRECT INJECTED GASEOUS FUEL SYSTEM AND RETROFIT KIT INCORPORATING THE SAME

BACKGROUND

Diesel engines have long been direct injected engines wherein fuel is injected at or near top dead center (TDC) directly into the combustion chamber. Many gasoline engines are now being developed as direct injected engines in order to take advantage of the efficiencies associated with direct injection. Direct injected gasoline engines are now possible due to advances in injector technology as well as advances in engine control strategy. However, direct injecting gaseous fuels such as natural gas or hydrogen have not yet gained similar feasibility.

One of the practical difficulties with using a gaseous fuel in a direct injected system is providing the fuel at a high enough pressure to be injected near top dead center while providing the necessary volume of fuel, which may be 3000 times the volume of operation on diesel fuel. Typical compressed natural gas (CNG) tanks are designed to contain fuel at approximately 3600 psi. In order to direct inject a gaseous fuel at or near top dead center, fuel must be at approximately 5800 psi. This high pressure is necessary in order to overcome the cylinder pressure under compression as well as to provide enough fuel into the cylinder.

Gaseous fuel has a lower energy density by volume when compared to diesel and gasoline, thus a much higher volume of fuel must be introduced into the cylinder in order to produce the same power. Existing infrastructure, tank technology, and fuel systems are designed around the standard 3600 psi system. Accordingly, there is a need for a gaseous fuel system capable of operating as a direct injected fuel system.

BRIEF DESCRIPTION OF THE DRAWINGS

Non-limiting and non-exhaustive embodiments of the devices, systems, and methods, including the preferred embodiment, are described with reference to the following FIGURE, wherein like reference numerals refer to like parts throughout the various views unless otherwise specified.

FIG. 1 is a schematic representation of a high pressure direct injected gaseous fuel system.

DETAILED DESCRIPTION

The representative embodiments disclosed herein include a high pressure direct injected gaseous fuel system and retrofit kit incorporating the same. In one embodiment, the system comprises a fuel tank capable of storing fuel at a first pressure and a compressor including an inlet capable of receiving the fuel, and operative to supply, at an outlet, compressed fuel at a second pressure higher than the first. The system also includes an accumulator connected to the outlet and a plurality of injectors connected to the accumulator. The injectors are adapted to inject fuel directly into a combustion chamber. In some embodiments, the injectors are injector-igniters. The system may further include a pressure relief valve interconnecting the fuel tank and the outlet, wherein the pressure relief valve is operative to allow fuel flow between the fuel tank and outlet if the second pressure exceeds a threshold pressure.

In certain aspects of the disclosed technology, the compressor further comprises a blow-by vent and in some embodiments, the system is installed on an engine and the blow-by vent is connected to an intake of the engine. In other aspects of the technology, the compressor is powered by an engine driven hydraulic pump.

In another representative embodiment, a high-pressure direct injected gaseous fuel system includes a fuel tank capable of storing fuel at a first pressure and a compressor including an inlet capable of receiving the fuel, and operative to supply, at an outlet, compressed fuel at a second pressure higher than the first. The system further includes an accumulator connected to the outlet and a plurality of injector-igniters connected to the accumulator, wherein the injector-igniters are adapted to inject fuel directly into a combustion chamber. In addition, a pressure relief valve interconnects the fuel tank and the outlet, and is operative to allow fuel flow between the fuel tank and outlet if the second pressure exceeds a threshold pressure.

Also provided herein is a high pressure direct injected gaseous fuel system retrofit kit. In a representative embodiment, the kit comprises a compressor including an inlet capable of receiving fuel at a first pressure, and operative to supply, at an outlet, compressed fuel at a second pressure higher than the first. The kit can also include an electric motor or engine drivable hydraulic pump, operative to provide power to the compressor, an accumulator connectable to the outlet, and a plurality of injectors connectable to the accumulator, wherein the injectors are adapted to inject fuel directly into a combustion chamber. In other embodiments, the retrofit kit includes a pressure relief valve interconnectable to a fuel tank and the outlet, and operative to allow fuel flow between the fuel tank and outlet if the second pressure exceeds a threshold pressure.

In one aspect of the technology, the kit includes a fuel tank capable of storing fuel at a first pressure and connectable to the compressor. In other aspects, the hydraulic pump is engine mountable, and in still further aspects of the technology, the hydraulic pump is adapted to mount in place of or in conjunction with an engine-mounted fuel pump.

Specific details of several embodiments of the technology are described below with reference to FIG. 1. Other details describing well-known structures and systems often associated with ignition systems, fuel systems, and electronic valve actuation, such as fuel pumps, regulators, and the like, have not been set forth in the following disclosure to avoid unnecessarily obscuring the description of the various embodiments of the technology. Many of the details, dimensions, angles, steps, and other features shown in the figures are merely illustrative of particular embodiments of the technology. Accordingly, other embodiments can have other details, dimensions, angles, steps, and features without departing from the spirit or scope of the present technology. A person of ordinary skill in the art, therefore, will accordingly understand that the technology may have other embodiments with additional elements, or the technology may have other embodiments without several of the features shown and described below with reference to FIG. 1.

Some aspects of the technology described below may take the form of or make use of computer-executable instructions, including routines executed by a programmable computer or controller. Those skilled in the relevant art will appreciate that aspects of the technology can be practiced on computer systems other than those described herein. Aspects of the technology can be embodied in one or more special-purpose computers or data processors, such as an engine control unit (ECU), engine control module (ECM), fuel system controller, ignition controller, or the like, that is specifically programmed, configured, or constructed to perform one or more computer-executable instructions consistent with the technology described below. Accordingly, the term "computer," "processor," or "controller" as may be used herein refers to any data processor and can include ECUs, ECMs, and modules, as well as Internet appliances and hand-held devices (including diagnostic devices, palm-top computers, wearable computers, cellular or mobile phones, multi-processor systems, processor-based or programmable consumer electronics, network computers, mini computers and the like). Information handled by these computers can be presented at any suitable display medium, including a CRT display, LCD, or dedicated display device or mechanism (e.g., a gauge).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Such networks may include, for example and without limitation, Controller Area Networks (CAN), Local Interconnect Networks (LIN), and the like. In particular embodiments, data structures and transmissions of data particular to aspects of the technology are also encompassed within the scope of the technology.

FIG. 1 illustrates a high pressure direct injected gaseous fuel system 100 according to a representative embodiment. In this embodiment, the fuel system 100 includes a pair of fuel storage tanks 102 and 104, which in this case are configured to contain LPG and/or a gaseous fuel such as CNG or hydrogen, for example. Each tank 102 and 104 is coupled to the necessary safety devices such as pressure relief devices 106, as well as the necessary control valves such as control valve 108, all of which are well known in the art. In this embodiment, fuel tanks 102 and 104 are adapted to store gaseous fuel at approximately 3600 psi, which is typical of compressed natural gas. Tanks 102 and 104 are filled via one or more fill nozzles 110 as shown. Tanks 102 and 104 may include filters and/or suitable engine coolant and/or electric heaters to assure adequately rapid delivery of gaseous fuel.

Fuel flows from tanks 102 and 104 at a first pressure to compressor 112 which is operative to compress the fuel. Compressor 112 includes inlets 113 capable of receiving fuel from the fuel tanks 102 and 104 and is operative to supply at outlets 115 compressed fuel at a second pressure higher than the first pressure. For example, compressor 112 receives fuel from tanks 102 and 104 at approximately 3600 psi and provides compressed fuel at approximately 5800 psi. Compressor 112 provides the high pressure fuel to accumulator 114 which is connected to outlets 115. Accumulator 114 in turn supplies a plurality of injectors 116.

Injectors 116 are adapted to inject a gaseous fuel directly into a combustion chamber. Injectors 116 may be in the form of injector-igniters such as those described in co-pending U.S. patent application Ser. No. 12/653,085, filed Dec. 7, 2009, the disclosure of which is incorporated herein by reference in its entirety. Injector-igniters may be particularly desirable in a retrofit kit in order to provide spark as well as fuel in the confined spaces of an existing cylinder head. A pressure regulator 118 is connected between accumulator 114 and the plurality of injectors 116, and functions to supply fuel at a constant pressure to the injectors 116. Fuel system 100 also includes a pressure relief valve 120 interconnected between the fuel tanks 102, 104 and the outlets 115 of compressor 112. The pressure relief valve 120 is operative to allow fuel flow between outlets 115 and fuel tanks 102 and 104, if the second pressure exceeds a threshold pressure. Accordingly, pressure relief valve 120 is operative to prevent over-pressurization of the accumulator 114 and the downstream fuel injection system. In the event that pressure exceeds the threshold pressure, the high pressure coming from the outlets 115 is vented back to the lower pressure tanks 102 and 104.

In some embodiments, the compressor 112 is a hydraulically-driven double-acting intensifier. Other suitable compressors as are known in the art may also be used. In an embodiment, compressor 112 includes a blow-by vent 123 to accommodate blow-by and leakage often associated with piston compression pumps. Any fuel vented through blow-by vent 123 flows through a blow-by flow meter 122 and is vented into the air intake 124 of an associated engine. Thus, rather than venting fuel to the atmosphere, the fuel is fed into the engine where it is burned in due course. Accordingly, because fuel is entering the intake system, the fuel injection system must account for the additional fuel in the air. To that end, the blow-by flow meter 122 communicates with an engine control module 200, which in turn adjusts the amount of fuel injected by fuel injectors 116 to the engine.

In this embodiment, compressor 112 is powered by an engine-driven hydraulic pump 126. The hydraulic pump 126 is part of an associated hydraulic system 128 which includes a tank 130 and the necessary control valves such as control valve 132. The fuel system 100 may also include a cooling system 134 in order to cool the compressed fuel at the outlets 115 from compressor 112. Cooling system 134 may also cool the hydraulic fluid used to power the compressor 112. It may also be used to heat a pressure regulator 118 in order to prevent freezing due to expansion of fuel therethrough.

The fuel system 100 as described above may also be the basis for a retrofit kit to convert diesel engines to run on alternative fuels such as compressed natural gas. Accordingly, various combinations of the above described components may be packaged and provided as a kit in order to convert such vehicles. For example, in one embodiment, a high-pressure direct injected gaseous fuel system retrofit kit includes a compressor 112, an engine-drivable hydraulic pump 126, an accumulator 114, and a plurality of injectors 116. In other embodiments, the kit may also include a pressure relief valve 120 that is interconnectable between the fuel tank and outlet. In still further embodiments, the kit may include one or more fuel tanks capable of storing fuel. In some embodiments hydraulic pump 126 is engine mountable and is adapted to mount in place of an engine mounted fuel pump. In other embodiments, the kit may also include pressure regulator 118. In still further embodiments, the kit may include all necessary fittings, valves, tubing, wiring and control modules such as shown in FIG. 1.

From the foregoing, it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Also contemplated herein are methods which may include any procedural step inherent in the structures and systems described. Accordingly, the disclosure and associated technology can encompass other embodiments not expressly shown or described herein. The following examples provide additional embodiments of the present technology.

EXAMPLES

1. A high-pressure direct injected gaseous fuel system, comprising:
a fuel tank capable of storing fuel at a first pressure;
a compressor including an inlet capable of receiving the fuel, and operative to supply, at an outlet, compressed fuel at a second pressure higher than the first;
an accumulator connected to the outlet; and
a plurality of injectors connected to the accumulator, wherein the injectors are adapted to inject fuel directly into a combustion chamber.

2. The system of example 1, further comprising a pressure relief valve interconnecting the fuel tank and the outlet.

3. The system of example 2, wherein the pressure relief valve is operative to allow fuel flow between the fuel tank and outlet if the second pressure exceeds a threshold pressure.

4. The system of example 1, wherein the compressor further comprises a blow-by vent.

5. The system of example 4, wherein the system is installed on an engine and the blow-by vent is connected to an intake of the engine.

6. The system of example 1, wherein the injector is an injector-igniter.

7. The system of example 1, wherein the compressor is powered by an engine driven hydraulic pump.

8. A high-pressure direct injected gaseous fuel system, comprising:
a fuel tank capable of storing fuel at a first pressure;
a compressor including an inlet capable of receiving the fuel, and operative to supply, at an outlet, compressed fuel at a second pressure higher than the first;
an accumulator connected to the outlet;
a plurality of injector-igniters connected to the accumulator, wherein the injector-igniters are adapted to inject fuel directly into a combustion chamber; and
a pressure relief valve interconnecting the fuel tank and the outlet, and operative to allow fuel flow between the fuel tank and outlet if the second pressure exceeds a threshold pressure.

9. The system of example 8, wherein the compressor further comprises a blow-by vent.

10. The system of example 9, wherein the system is installed on an engine and the blow-by vent is connected to an intake of the engine.

11. The system of example 10, wherein the compressor is powered by a hydraulic pump driven by the engine.

12. A high-pressure direct injected gaseous fuel system retrofit kit, comprising:
a compressor including an inlet capable of receiving fuel at a first pressure, and operative to supply, at an outlet, compressed fuel at a second pressure higher than the first;
an electric motor or engine drivable hydraulic pump, operative to provide power to the compressor;
an accumulator connectable to the outlet; and
a plurality of injectors connectable to the accumulator, wherein the injectors are adapted to inject fuel directly into a combustion chamber.

13. The retrofit kit of example 12, further comprising a pressure relief valve interconnectable to a fuel tank and the outlet, and operative to allow fuel flow between the fuel tank and outlet if the second pressure exceeds a threshold pressure.

14. The retrofit kit of example 12, further comprising a fuel tank capable of storing fuel at a first pressure and connectable to the compressor.

15. The retrofit kit of example 12, wherein the injectors are injector-igniters.

16. The retrofit kit of example 12, wherein the compressor further comprises a blow-by vent.

17. The retrofit kit of example 16, wherein the blow-by vent is connectable to an intake of an engine.

18. The retrofit kit of example 12, wherein the hydraulic pump is engine mountable.

19. The retrofit kit of example 18, wherein the hydraulic pump is adapted to mount in place of an engine mounted fuel pump.

20. The retrofit kit of example 12, further comprising a pressure regulator connectable between the accumulator and the plurality of injectors.

We claim:

1. A high-pressure direct injected gaseous fuel system, comprising:
a fuel tank capable of storing fuel at a first pressure;
a compressor comprising an inlet capable of receiving the fuel, and operative to supply, at an outlet, the fuel at a second pressure higher than the first pressure;
an accumulator in fluid communication with the outlet to receive and to store the compressed gaseous fuel from the compressor and in fluid communication with the inlet through a pressure regulator to convey excess compressed gaseous fuel to the compressor;
a pressure relief valve interconnecting the fuel tank and the outlet, and operative to allow fuel flow between the fuel tank and outlet if the second pressure exceeds a threshold pressure; and
a plurality of injectors connected to the accumulator, wherein the injectors are adapted to inject the fuel directly into a combustion chamber.

2. The system of claim 1, wherein the compressor further comprises a blow-by vent in fluid communication with the compressor and an air intake of the engine to vent excess gaseous fuel within the compressor due to compressor blow-by and leakage directly to the air intake.

3. The system of claim 1, wherein the injector comprises an injector-igniter.

4. The system of claim 1, further comprising an engine driven hydraulic pump connected to the compressor.

5. A high-pressure direct injected gaseous fuel system, comprising:
a fuel tank capable of storing fuel at a first pressure;
a compressor comprising an inlet capable of receiving the fuel, and operative to supply, at an outlet, the fuel at a second pressure higher than the first pressure;
an accumulator in fluid communication with the outlet to receive and to store the compressed gaseous fuel from the compressor and in fluid communication with the inlet through a pressure regulator to convey excess compressed gaseous fuel to the compressor;
a plurality of injector-igniters connected to the accumulator, wherein the injector-igniters are adapted to inject the fuel directly into a combustion chamber; and
a pressure relief valve interconnecting the fuel tank and the outlet, and operative to allow fuel flow between the fuel tank and outlet if the second pressure exceeds a threshold pressure.

6. The system of claim 5, wherein the compressor further comprises a blow-by vent in fluid communication with the compressor and an air intake of the engine to vent excess gaseous fuel within the compressor due to compressor blow-by and leakage directly to the air intake.

7. The system of claim 5, wherein the compressor is powered by a hydraulic pump driven by the engine.

8. A high-pressure direct injected gaseous fuel system retrofit kit, comprising:
- a compressor comprising an inlet capable of receiving fuel at a first pressure, and operative to supply, at an outlet, the fuel at a second pressure higher than the first pressure, the compressor further comprising a blow-by vent connectable to an intake of an engine;
- an engine drivable hydraulic pump, operative to provide power to the compressor;
- an accumulator in fluid communication with the outlet to receive and to store the compressed gaseous fuel from the compressor and in fluid communication with the inlet through a pressure regulator to convey excess compressed gaseous fuel to the compressor; and
- a plurality of injectors connectable to the accumulator, wherein the injectors are adapted to inject the fuel directly into a combustion chamber.

9. The retrofit kit of claim 8, further comprising a pressure relief valve interconnectable to a fuel tank and the outlet, and operative to allow fuel flow between the fuel tank and outlet if the second pressure exceeds a threshold pressure.

10. The retrofit kit of claim 8, further comprising a fuel tank capable of storing fuel at a first pressure and connectable to the compressor.

11. The retrofit kit of claim 8, wherein the injectors comprise injector-igniters.

12. The retrofit kit of claim 8, wherein the hydraulic pump is engine mountable.

13. The retrofit kit of claim 12, wherein the hydraulic pump is adapted to mount in place of an engine mounted fuel pump.

14. The retrofit kit of claim 8, further comprising a pressure regulator connectable between the accumulator and the plurality of injectors.

15. A high-pressure direct injected gaseous fuel system, comprising:
- a fuel tank capable of storing gaseous fuel at a first pressure;
- a compressor in fluid communication with the fuel tank, wherein the compressor comprises an inlet capable of receiving the gaseous fuel from the fuel tank, and operative to supply, at an outlet, compressed gaseous fuel at a second pressure higher than the first pressure;
- an accumulator in fluid communication with the outlet to receive and to store the compressed gaseous fuel from the compressor and in fluid communication with the inlet through a pressure regulator to convey excess compressed gaseous fuel to the compressor;
- a plurality of injectors in fluid communication with the accumulator, wherein the plurality of injectors are adapted to inject the compressed gaseous fuel from the accumulator directly into a combustion chamber of an engine;
- a blow-by vent in fluid communication with the compressor and an air intake of the engine to vent excess gaseous fuel within the compressor due to compressor blow-by and leakage directly to the air intake; and
- a blow-by flow meter in communication with the blow-by vent and an engine communication module, such that the engine control module can adjust amount of the compressed gaseous fuel from the accumulator injected by the plurality of injectors into the combustion chamber of the engine to account for the excess compressed gaseous fuel directly vented to the air intake from the blow-by vent.

16. The system of claim 15, wherein the injector comprises an injector-igniter.

17. The system of claim 15, further comprising an engine driven hydraulic pump connected to the compressor.

18. The system of claim 15, further comprising a pressure relief valve interconnectable to the fuel tank and the outlet, and operative to allow fuel flow between the outlet and the fuel tank if the second pressure exceeds a threshold pressure.

19. The system of claim 15, further comprising a pressure regulator connectable between the accumulator and the plurality of injectors.

* * * * *